United States Patent [19]

Noyes, II et al.

[11] Patent Number: 5,775,436
[45] Date of Patent: Jul. 7, 1998

[54] SOD HARVESTER WITH PIVOTABLE ROLL-FORMING UNIT

[75] Inventors: Thomas E. Noyes, II, Creston; Roelof H. DeVries, Dalton; Glenn D. Gerber, Apple Creek, all of Ohio

[73] Assignee: Steiner Turf Equipment, Inc., Dalton, Ohio

[21] Appl. No.: 686,555

[22] Filed: Jul. 26, 1996

[51] Int. Cl.[6] .................................................. A01B 45/04
[52] U.S. Cl. ......................... 172/20; 172/33; 172/19; 198/308.1; 414/911
[58] Field of Search ............................. 172/19, 20, 33; 47/56; 414/911, 739.7; 198/308.1; 111/901

[56] References Cited

U.S. PATENT DOCUMENTS

| | | | |
|---|---|---|---|
| 3,053,328 | 9/1962 | Geipel | 172/19 |
| 3,235,011 | 2/1966 | Pasinski et al. | 172/19 |
| 3,429,377 | 2/1969 | Nunes, Jr. | 172/19 |
| 3,485,304 | 12/1969 | Daymon | 172/19 |
| 3,540,535 | 11/1970 | Brouwer et al. | 172/20 |
| 3,590,927 | 7/1971 | Brouwer et al. | 172/20 |
| 3,664,432 | 5/1972 | Nunes, Jr. | 172/19 |
| 4,828,040 | 5/1989 | Schumacher | 172/20 X |
| 4,832,130 | 5/1989 | Brouwer et al. | 172/19 |
| 4,892,153 | 1/1990 | Cooling et al. | 172/20 |
| 4,903,778 | 2/1990 | Brouwer et al. | 172/10 X |
| 4,944,352 | 7/1990 | Brouwer et al. | 172/19 |
| 5,064,000 | 11/1991 | Dover et al. | 172/19 |
| 5,129,462 | 7/1992 | Mail | 172/19 |

Primary Examiner—Terry Lee Melius
Assistant Examiner—Victor Batson
Attorney, Agent, or Firm—Kilpatrick Stockton LLP

[57] ABSTRACT

A sod harvester includes a cutter for forming a strip of cut sod, and an inclined conveyor for conveying the strip from the cutter to a roll-forming enclosure. The roll-forming enclosure comprises two belt conveyors at right angles to one another. The strip is delivered onto a generally horizontal one of the two conveyors, by which it is moved towards the second conveyor. The second conveyor then causes the leading end portion of the strip to turn back on itself and form the roll. A pair of spring-biassed fingers ensure proper roll formation. The strip of sod is cut transversely at an appropriate point and the sod within the enclosure is rolled up to complete the roll. The enclosure is turnable about a vertical axis to a laterally directed position, in which the roll can be discharged laterally clear of the next pass of the harvester. The roll can be wrapped in netting which is automatically cut as the roll-forming enclosure turns. The enclosure can be arrested in an intermediate position for release of a core tube into the enclosure, so that the roll is formed around the tube.

16 Claims, 9 Drawing Sheets

SOD HARVESTER WITH PIVOTABLE ROLL-FORMING UNIT

FIELD OF THE INVENTION

This invention relates generally to sod harvesters; that is, machines for cutting strips of sod from the ground and automatically forming those strips into rolls.

BACKGROUND OF THE INVENTION

A sod harvester usually has a horizontal blade which severs the sod from the ground at the desired thickness, in combination with two vertical side blades which cut the sod to the desired width. Thus, a continuous strip of sod is formed as the harvester travels along its cutting path. A vertical cutter blade periodically is driven into the sod adjacent the undercutting blade to sever the strip to length.

As the strip of sod is cut, it is conveyed away from the cutter blade, usually up an inclined conveyor, for forming into rolls. U.S. Pat. No. 3,509,944 (Brouwer et al.) discloses a prior art sod harvester which includes such an inclined conveyor, and in which the rolls of sod are formed adjacent the upper end of the conveyor. The sod harvester disclosed in the '944 patent is designed to be mounted at the side of a farm tractor, by which the harvester is propelled.

U.S. Pat. No. 4,832,130 (Brouwer et al.) discloses a self-propelled sod harvester. In this case, the harvester also includes an inclined conveyor but in this case, the strip of sod is delivered by the conveyor into a separate roll-forming enclosure which includes a pair of conveyors disposed generally at right angles to one another, for forming the roll. The formed rolls are discharged onto a cart at the end of the harvester which can convey the formed roll to either side of the cart and clear of the harvester on its next pass. The '130 patent also discloses a curved conveyor for discharging formed rolls clear of the harvester.

The disclosures of U.S. Pat. Nos. 3,509,944 and 4,832,130 are incorporated herein by reference.

SUMMARY OF THE INVENTION

It is an object of the present invention to provide various improvements in sod harvesters, particularly directed at facilitating the formation of large size rolls of sod.

In accordance with the invention, there is provided a sod harvester for movement along a sod cutting path including cutter means for forming a strip of cut sod as the harvester travels along that path, and sod roll forming means to which the strip of cut sod is delivered from the cutter means. The roll-forming means includes first and second linear conveyors each having an inner end and an outer end and being operable to convey sod between said ends. The first conveyor is arranged to receive a leading end portion of an incoming strip of cut sod and convey that strip towards the second conveyor. The conveyors are arranged with their inner ends adjacent one another and at a substantial angle with respect to one another so that, in use, the second conveyor causes the leading end portion of the strip of sod to tend to turn back on itself for forming a roll. Means is also provided for laterally confining the growing roll to assure formation of a roll having ends which are square with respect to the surface of the roll.

In one aspect of the invention the roll-forming means comprises a sub-assembly which is turnable about a generally upright axis between a roll-forming position for receiving a strip of sod and forming a roll, and a discharge position in which the first conveyor is directed laterally of the path of travel of the harvester for discharge of a formed roll to a position which is laterally clear of the next pass of the harvester.

In another aspect of the invention, the roll-forming means includes abutment means associated with the second conveyor and located to obstruct travel of the leading end portion of a strip of sod along the second conveyor, and causing that end portion to tend to turn back on itself for assuring formation of the roll. The abutment means is deflectable to a non-obstructing position by the roll of sod as the roll grows in size.

Preferably, the first and second conveyors are belt conveyors and the abutment means comprise a pair of spring-biassed fingers that project on either side of the surface of the belt so as to engage marginal portions of the strip of sod. These fingers effectively ensure that the leading end portion of the strip is deflected so as to begin formation of the roll. As the roll grows, the fingers are deflected out of the way, against the effect of the spring biassing.

Roll-forming means in the form of a sub-assembly which is turnable between a roll-forming position and a discharge position has the advantage that quite large rolls of sod can be formed and then discharged directly onto the ground without the need for further handling. The assembly can be manufactured as an enclosure or "cradle" comprising the first conveyor as the bottom or base of the cradle, the second conveyor is a back wall, and planar side panels or walls at opposite sides of the conveyors, forming the said means for laterally confining the growing roll.

A sod harvester in accordance with the present invention can be designed as a self-propelled machine, generally along the lines disclosed in the '130 patent (supra) or as an attachment to a farm tractor or other propulsion vehicle along the lines of the '944 patent (supra).

BRIEF DESCRIPTION OF DRAWINGS

In order that the invention may be more clearly understood and readily carried into effect, reference will now be made to the accompanying drawings which illustrate a preferred embodiment of the invention by way of example, and in which.

DESCRIPTION OF PREFERRED EMBODIMENT

Figure 1:
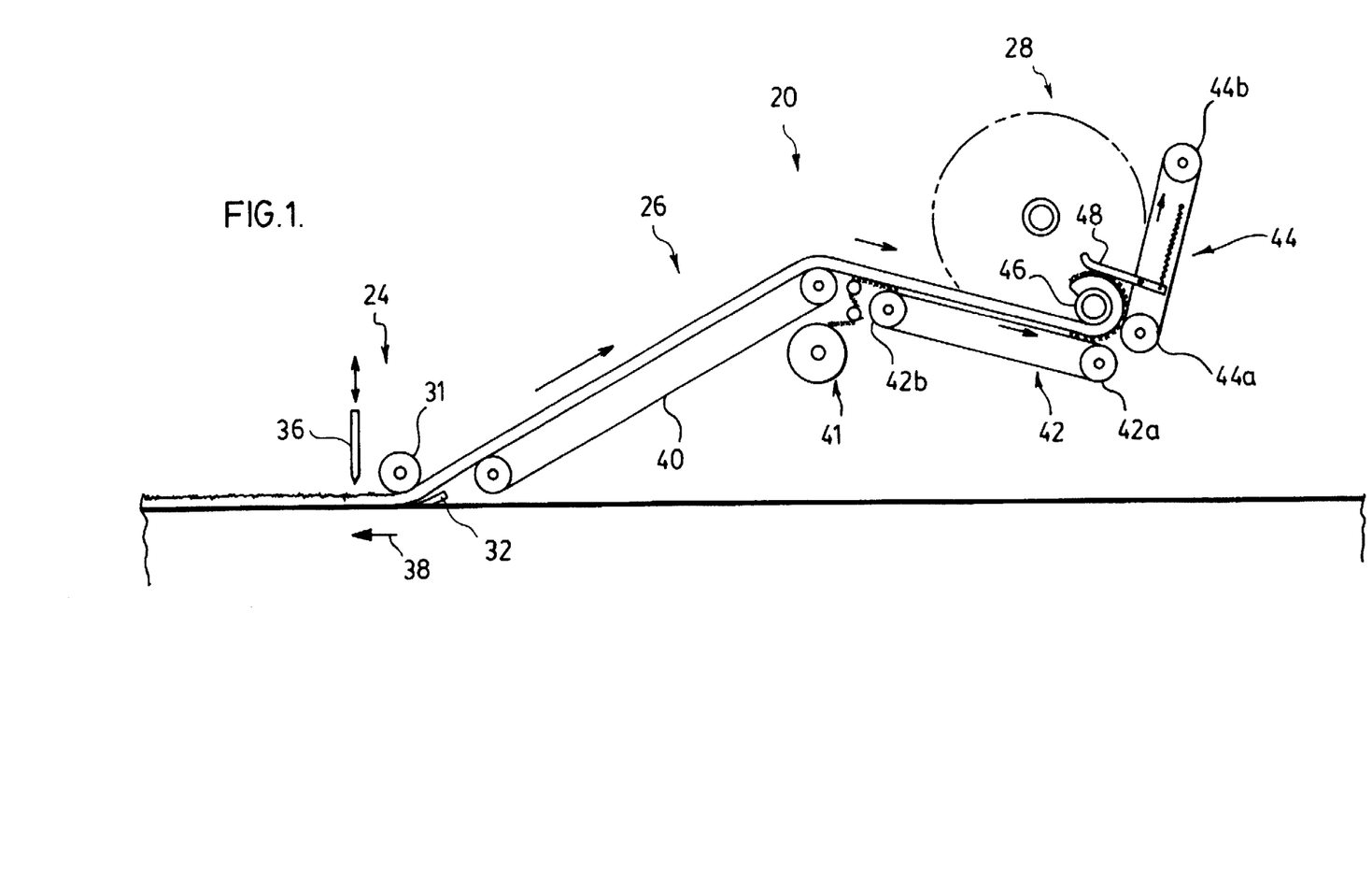
FIG. 1 is a diagrammatic side elevational view illustrating the principal components of a sod harvester in accordance with the invention.
Figure 2:
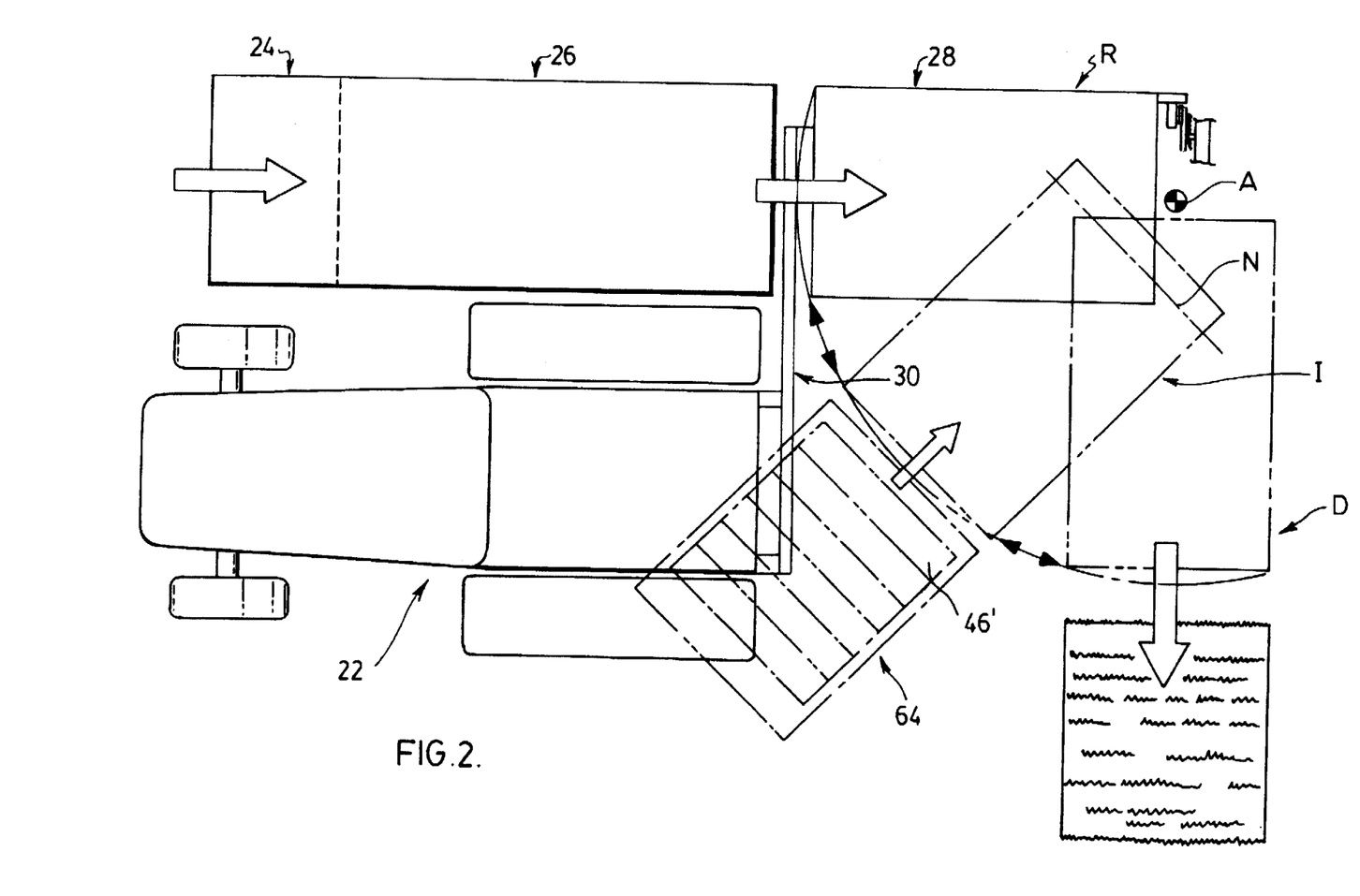
FIG. 2 is a diagrammatic plan view corresponding to FIG. 1, showing the harvester coupled to a farm tractor.

Referring first to FIGS. 1 and 2, a sod harvester in accordance with the present invention is generally denoted by reference numeral 20 and is shown (in FIG. 2) mounted alongside a conventional farm tractor 22 that serves as a propulsion vehicle for the harvester. The harvester itself essentially comprises three parts, namely a sod cutter sub-assembly which is generally denoted by reference numeral 24, a conveyor sub-assembly 26 which conveys the cut sod away from the cutter assembly, and a roll-forming sub-assembly 28 which receives the cut sod, forms it into rolls and discharges the rolls as will be described. In this particular embodiment, the roll-forming sub-assembly 28 is designed as a wheeled cart that is pivotally coupled to a frame 30 extending laterally to the right and side of the tractor 22 (FIG. 2). The sod cutter sub-assembly 24 and the conveyor sub-assembly 26 have a common frame (not shown) which is pivoted at its rear end on frame 30 and supported at its front end on a ground roller 31 generally in the manner disclosed in the '944 patent (supra). An adjustable hoist (not shown) carried by the tractor allows the sod cutter sub-assembly to be raised and lowered.

Figure 3:
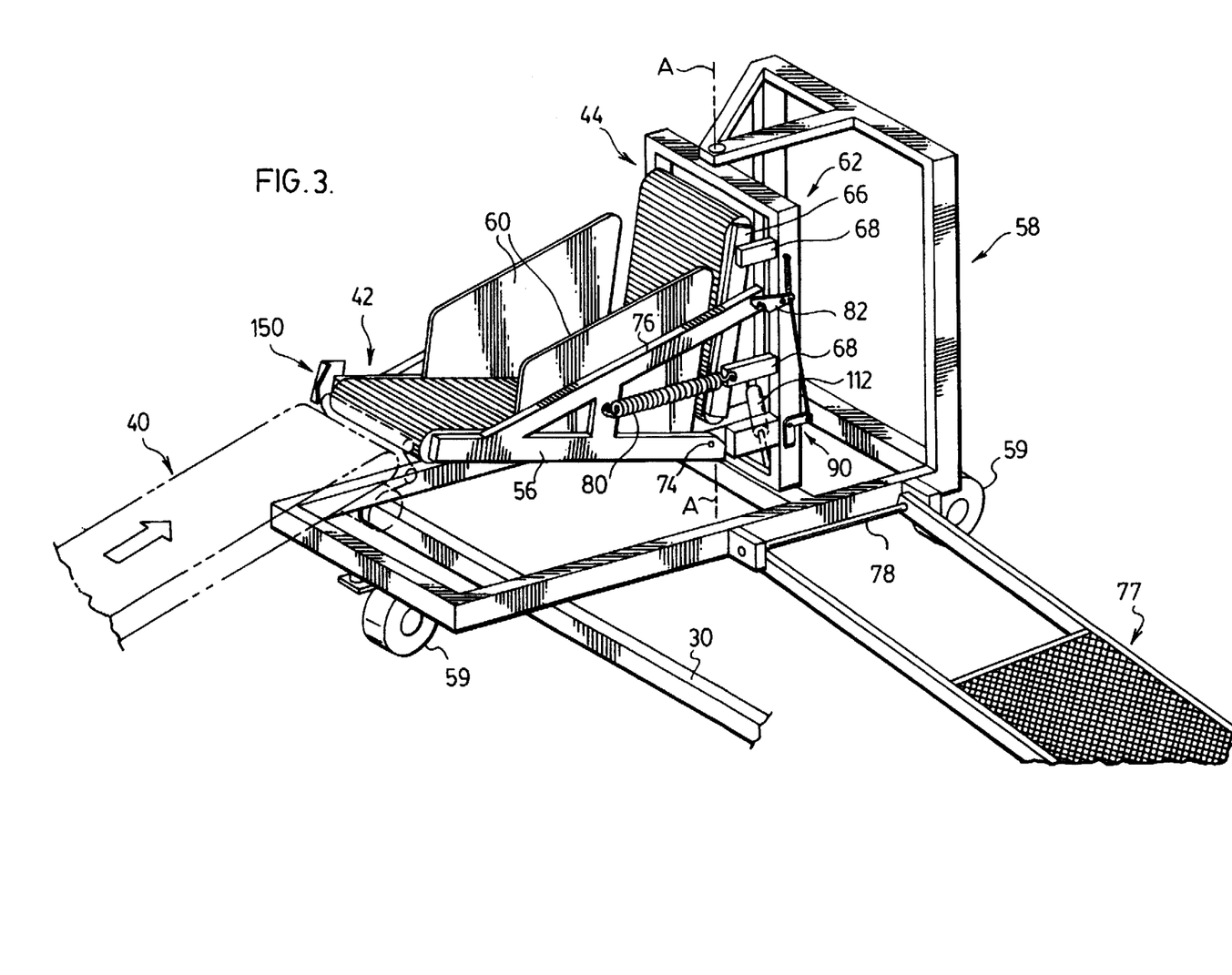
FIG. 3 is a perspective view of the roll-forming enclosure sub-assembly in position for receiving an in-coming strip of sod.
Figure 4:
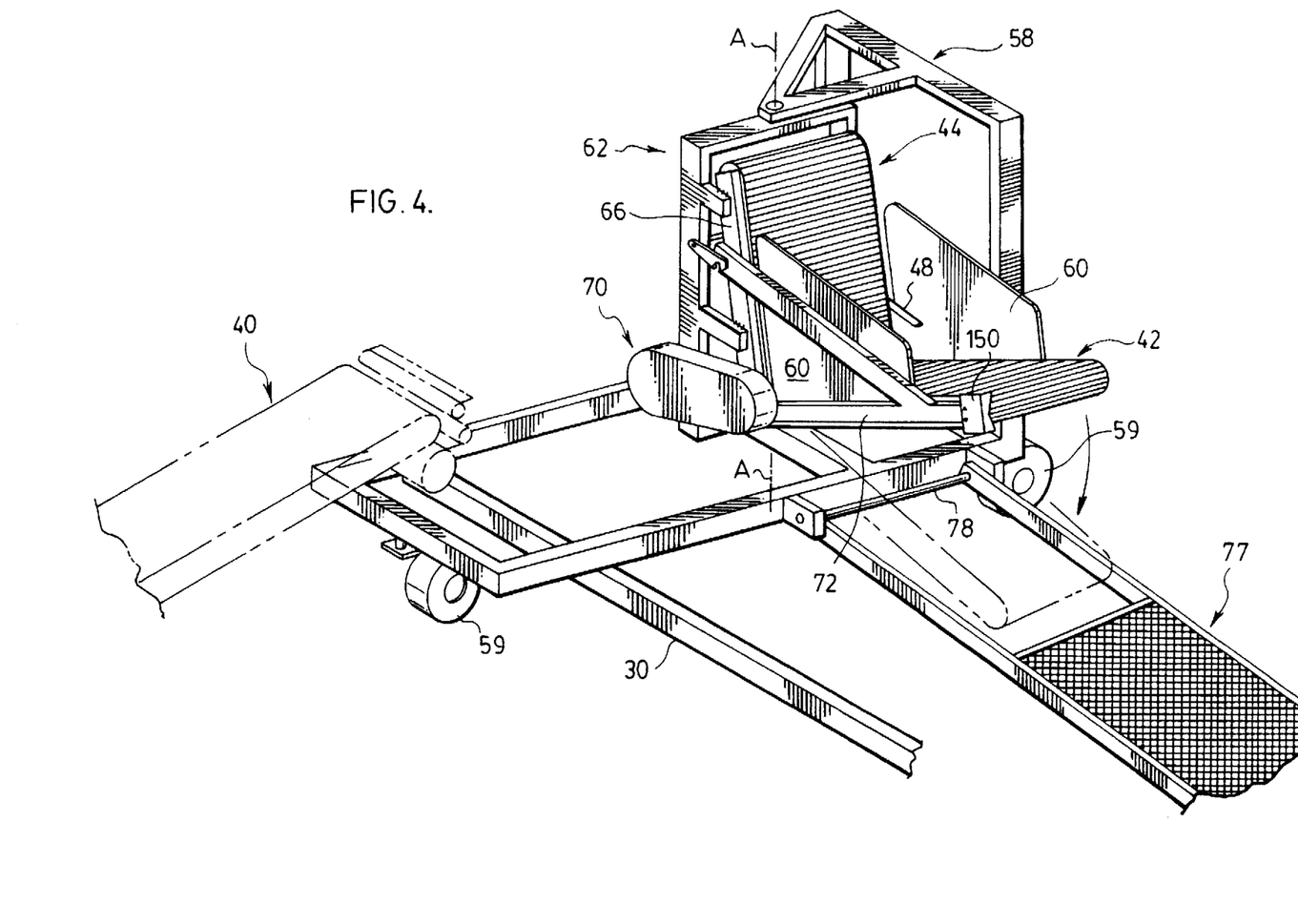
FIG. 4 is a view similar to FIG. 3 showing the roll-forming enclosure in a discharge position.

The roll-forming sub-assembly 28 is shown separately in some detail in FIGS. 3 and 4 (to be described).

Referring back to FIG. 1, the cutter sub-assembly 24 comprises an undercutting blade 32 which works in association with roller 31, and a vertically movable cutter blade 36 for cutting the strips of sod to length. Details of the cutter assembly 24 do not form part of the present invention and will therefore not be described in detail. It may be constructed as described in the '944 and/or '130 patent. For the purposes of the present invention, suffice it to say that the undercutting blade 32 severs the sod from the ground at the desired thickness as the sod harvester travels along a cutting path (generally indicated by reference numeral 38). Blade 32 will include or will be associated with vertical blade elements at its ends for cutting the sod to width (typically 24 inches). The blade may be reciprocated laterally and/or longitudinally to assist the cutting action. Blade 36 is a simple cutter blade that is driven into the sod at timed intervals by springs (not shown) to cut the strips of sod to length. Reference may be made to the '944 and '130 patents (supra) for details of these parts of the machine.

The conveyor sub-assembly 26 comprises a simple belt conveyor 40 which is arranged in an inclined position with its leading end immediately behind the cutter blade 32, so that the leading end of a strip of sod cut from the ground will travel naturally from the cutter blade onto to the top run of the belt, by which it will be conveyed upwardly and into the roll-forming sub-assembly 28. Immediately below the upper end of the belt conveyor 40 is a support for a roll of netting indicated at 41, which can be used to wrap the sod if desired. This part of the harvester is illustrated in more detail in FIG. 6, which will be described later.

The roll-forming sub-assembly 28 comprises first and second linear conveyors 42 and 44 each having an inner end and an outer end (42a, 42b; 44a, 44b), and being operable to convey sod between the said ends. The first conveyor 42 is arranged to receive a leading end portion of an incoming strip of cut sod and to convey that strip towards the second conveyor 44. It will be seen that the conveyors are arranged with their inner ends (42a, 44a) adjacent one another and at a substantial angle with respect to one another (e.g. approximately a right angle). In the illustrated embodiment, the first conveyor 42 is generally horizontal but inclined slightly downwardly towards its inner end 42a, for assuring smooth and buckle-free transport of a strip of sod from the inclined conveyor 26 into the roll-forming sub-assembly.

The conveyors 42 and 44 are identical belt conveyors. When a roll of sod is being formed, the conveyors are driven so that their top runs move in the directions indicated by the arrows in FIG. 1, i.e. so that the leading end portion of the strip of sod is directed by conveyor 42 towards conveyor 44 and is then lifted by conveyor 44 so that it will tend to turn back on itself and form a roll. In some circumstances, it will be desirable to form the roll around a rigid core as shown at 46 in FIG. 1, though a core is not always used.

In order to assure formation of a good tight roll, the second conveyor 44 is provided with abutment means in the form of a pair of spring biassed fingers, one of which is indicated at 48 in FIG. 1. The fingers engage marginal portions of the roll of sod at oppose sides of the belt of conveyor 44 and are arranged to obstruct travel of the leading end portion of the strip along the second conveyor means and ensure that the leading end portion of the strip does turn back on itself and begin to form a roll. As will be described in more detail later, the fingers 48 are pivotally mounted and spring biassed downwardly at their outer ends, so that they are deflectable as the roll of sod grows. In other words, the fingers are pushed upwardly out of the way as the roll forms between the two conveyors, and have no effect once the roll has been started.

Figure 6:
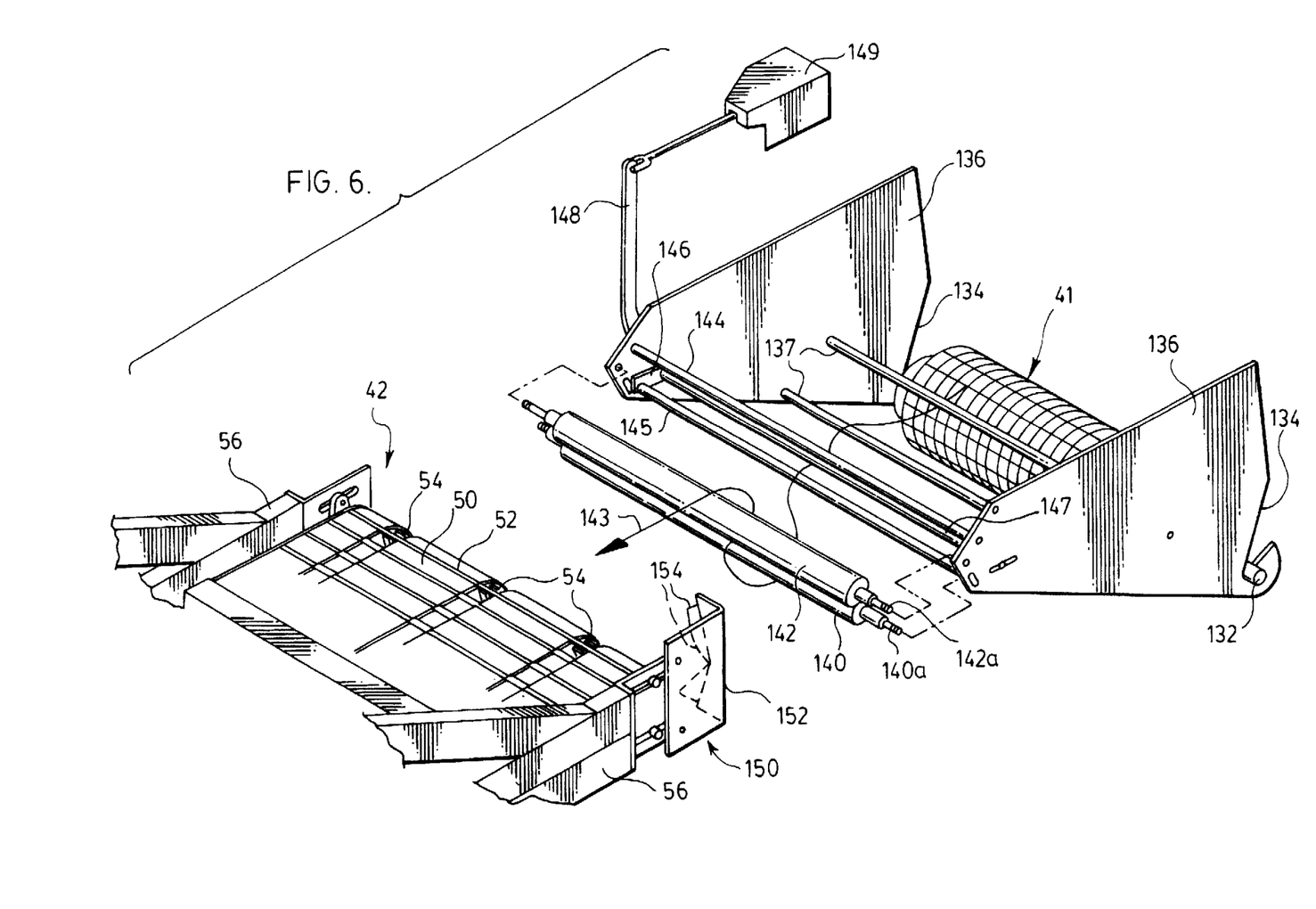
FIG. 6 is a partially exploded perspective view from the opposite side as compared with FIGS. 3 and 4, illustrating an arrangement for providing the sod roll with a net wrap.

The three conveyors 40, 42 and 44 have not been shown in detail in FIG. 1 but are essentially the same as one another. Precise constructional details of the belt conveyors are not believed critical to the invention. However, for the sake of clarity, part of the outer end portion of conveyor 42 is shown in FIG. 6, from which it will be seen that the conveyor includes rubber belting 50 which incorporates transverse lugs 52 spanning longitudinal spaces in the belting. The spaces accommodate sprockets 54 that engage the lugs for positively driving the belt.

Appropriate side support members such as are typical in such conveyors are shown at 56 and again have not been described in detail since they are conventional and not significant to the invention. Conveyor 40 is driven by a hydraulic motor (not shown) through a chain drive system in a manner which may readily be realized by a person skilled in the art. Preferably, the speed at which the conveyor 40 is driven is related to the ground speed of the sod harvester. Provision may be made to adjust the speed of the conveyor, for example, so that it can move at a slightly higher linear speed than the ground speed to ensure that tension is maintained in the strip of sod.

The conveyors 42 and 44 are of essentially the same construction as conveyor 40 and are chain driven from a common hydraulic motor carried by the chassis of the roll-forming sub-assembly (to be described). Again, provision may be made for varying the motor speed to maintain tension in the strip of sod.

It will be seen from FIG. 3 that the roll-forming sub-assembly 28 has a chassis 58 which is supported on wheels 59. The two conveyors 42 and 44 form part of a unitary roll-forming enclosure including side plates 60 between which the roll of sod is formed, and which ensure that the ends of the roll are square with respect to the surface of the roll. The unit also includes an end frame 62 which is pivoted to the main chassis 58 for turning about a generally upright axis denoted A—A, so that the roll-forming enclosure can be turned between the roll-forming position in which it is shown in FIG. 3 for receiving an incoming strip of sod and forming a roll, and a discharge position shown in FIG. 4 in which the enclosure is directed laterally of the path of travel of the harvester for discharging the formed roll.

FIG. 2 diagrammatically shows this turning movement of the roll-forming enclosure. The normal roll-forming position of the enclosure is shown at R and the discharge position at D. The turning axis is indicated at A. Shown in ghost outline and denoted I is an intermediate position in which the operator of the harvester can release into the enclosure a core tube such as the tube shown at 46 in FIG. 1. In FIG. 2, a supply for the core tubes is indicated at 64. The tube denoted 46' is shown in a position prior to release into the roll-forming enclosure. In this position, tube 46' is generally parallel to a notarial axis N about which a roll of sod will be formed in the roll-forming enclosure. Details of the supply and release mechanism will be described later in connection with FIG. 9.

Referring back to FIGS. 3 and 4, the frame 62 by which the roll-forming enclosure is pivotally coupled to the chassis 58 supports side members 66 of the upright (second) conveyor 44 through brackets 68. Frame 62 also carries a support bracket for a hydraulic drive motor assembly 70 for conveyors 44 and 46 (see FIG. 4).

The lower (first) conveyor 42 of the roll-forming enclosure has side members 56 which are pivotally coupled at their inner ends to the frame 62, about a horizontal axis indicated at 74. The side plates 60 are coupled to the conveyor side members 56 by supports 76 but are free of connection to the conveyor 44 or frame 62. The pivotal mounting of the conveyor side members 56 allows the lower conveyor 42 to be inclined downwardly towards its outer end so that a roll formed in the roll-forming enclosure will simply roll out of the enclosure onto the ground. The roll may be discharged directly onto the ground or onto a spring-loaded ramp 77 coupled to the chassis 58 by a pivot rod 78, for minimizing damage to the sod.

The lower conveyor 42 is normally maintained in the roll-forming position in which it is shown in FIG. 3 by a heavy duty tension spring that extends between frame 62 and the support structure for one of the side plates 60. This spring is shown in FIG. 3 at 80 and in FIG. 7. The effect of spring 80 is overcome by the weight of the sod when a full roll has been formed. In other words, the lower conveyor 42 will then incline downwardly under the weight of the sod. Once the sod roll has been discharged, the spring 80 will return the lower conveyor to its roll-forming position.

Figure 7:
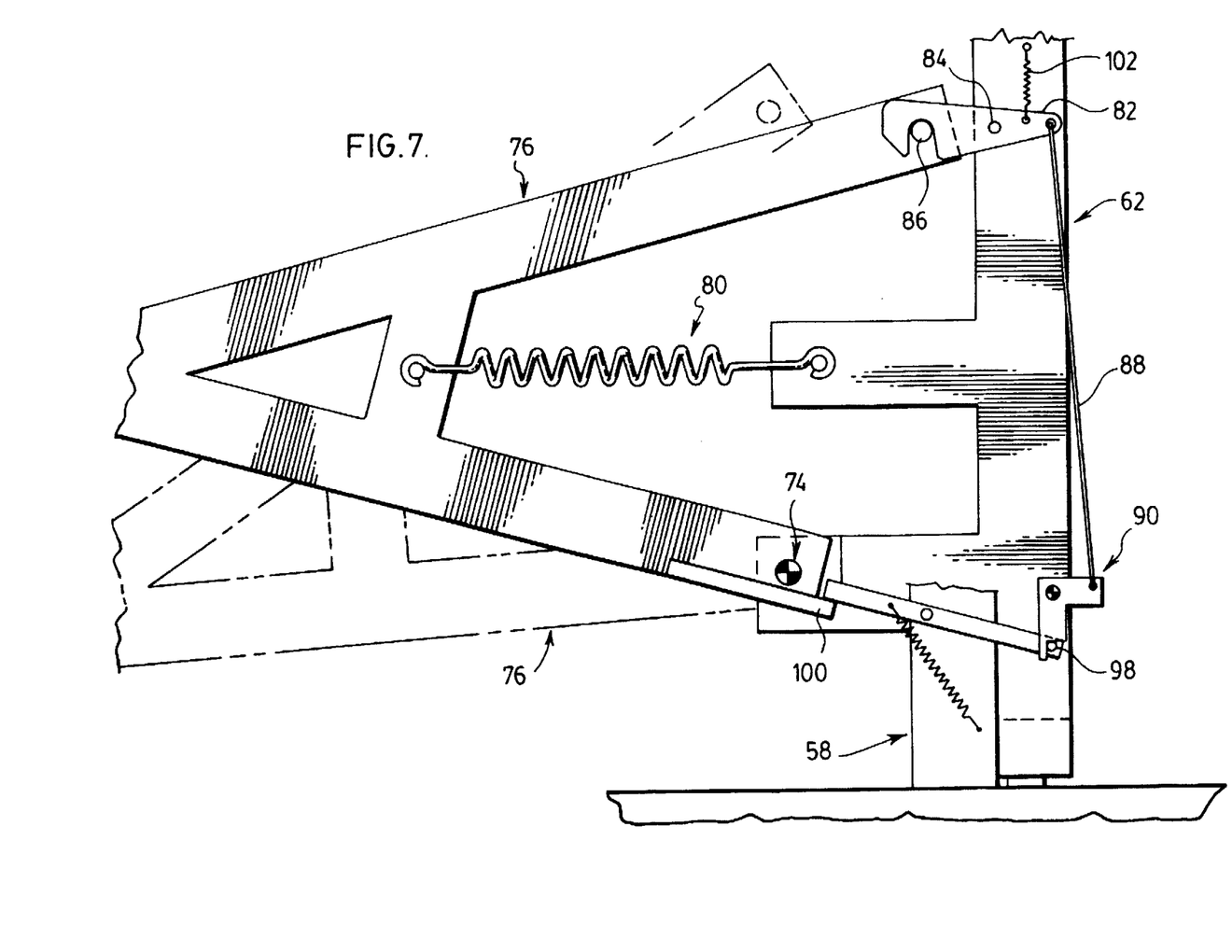
FIG. 7 is a diagrammatic illustration of a linkage that is used to effect "dumping" of a completed roll of sod from the harvester.

FIG. 7 shows a latch, for holding the lower conveyor in its upper position until the operator is ready to release the roll. A latch 82 is pivotally mounted on frame 62 (at 84) and engages a pin 86 on the side plate support structure 76. A chain 88 extends downwardly from latch 82 remote from pin 86 and is coupled at its lower end to one arm of a bell-crank 90 which is pivoted to frame 62 at 92.

Pivotally mounted on the main chassis 58 of the roll-forming sub-assembly (and therefore fixed with respect to the turnable roll-forming enclosure) is a lever 94 which is pivoted at 96. A pin 98 adjacent one end of lever 94 is disposed in the path of the second arm of the bell-crank lever 90 and comprises trip means which causes the bell crank lever to rotate clockwise as shown in FIG. 7 as the lever contacts the pin, pulling down on chain 88 and releasing latch 82. As the lower conveyor 42 tilts down, an abutment 100 on the relevant conveyor side member 72 lifts the end of lever 94 opposite pin 98, thereby releasing bell-crank 90 and allowing the latch 82 to return to its normal latching position under the influence of a spring 102. Thus, as the lower conveyor returns to it normal roll-forming position under the influence of spring 80, latch 82 re-engages pin 86.

Figure 5:
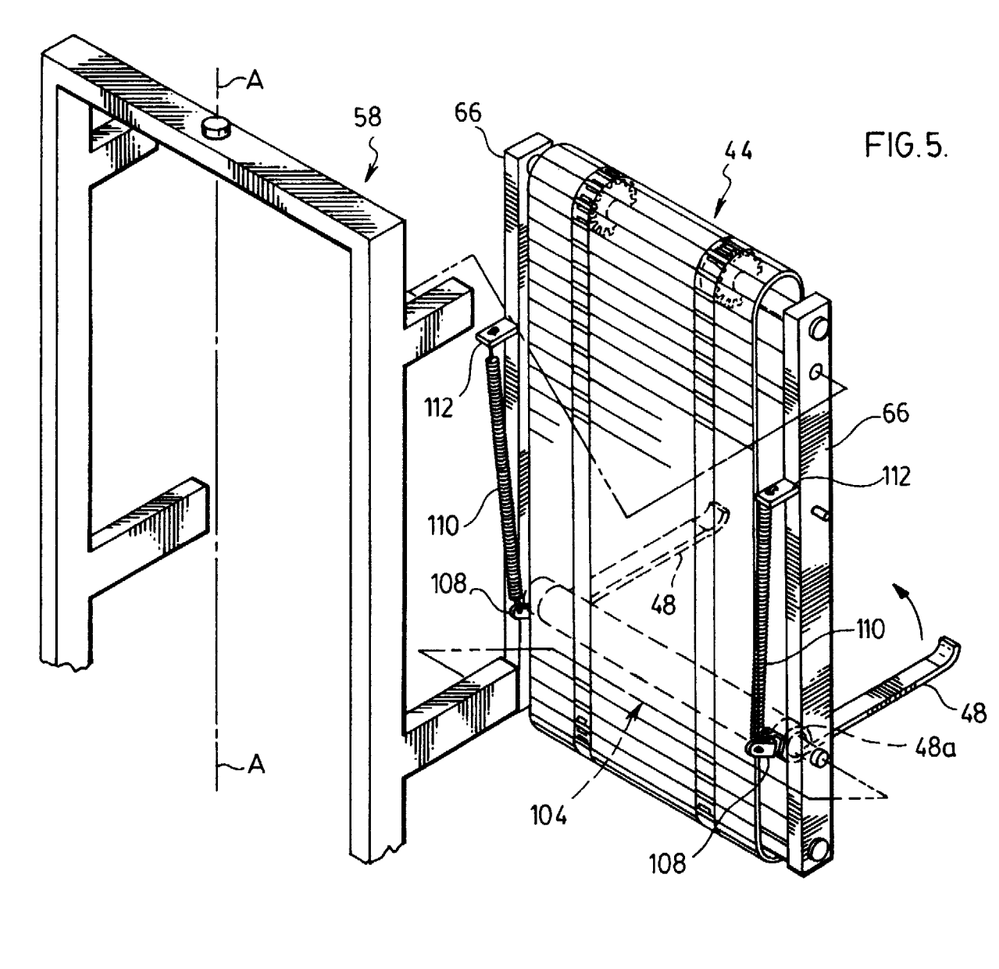
FIG. 5 is a detail view illustrating spring-biassed fingers that are used in association with the second conveyor of the roll-forming enclosure.

FIG. 5 shows a detail of the roll-forming enclosure, namely the two fingers 48 that are used to start the roll, as discussed previously in connection with FIG. 1. It will be seen from FIG. 5 that those two fingers are mounted outwardly of the belt of the second conveyor 44 on a pivot shaft 104 that extends between the side members 66 of that conveyor. Collars 48a at the inner ends of the respective fingers 48 are provided with brackets 108 and a tension spring 110 extends between each bracket and a further bracket 112 fixed to the relevant conveyor side member 66. Springs 110 accordingly provide the spring biassing effect for the fingers 48 and allow the fingers to be deflected as the sod roll grows.

Referring back to FIG. 3, a hydraulic cylinder 112 extends between the main chassis 58 and frame 62 and is operable to turn the frame and the roll-forming enclosure about axis A between the roll-forming position R and the discharge position D (FIG. 2) described in connection with FIG. 2.

Figures 8A, 8B:
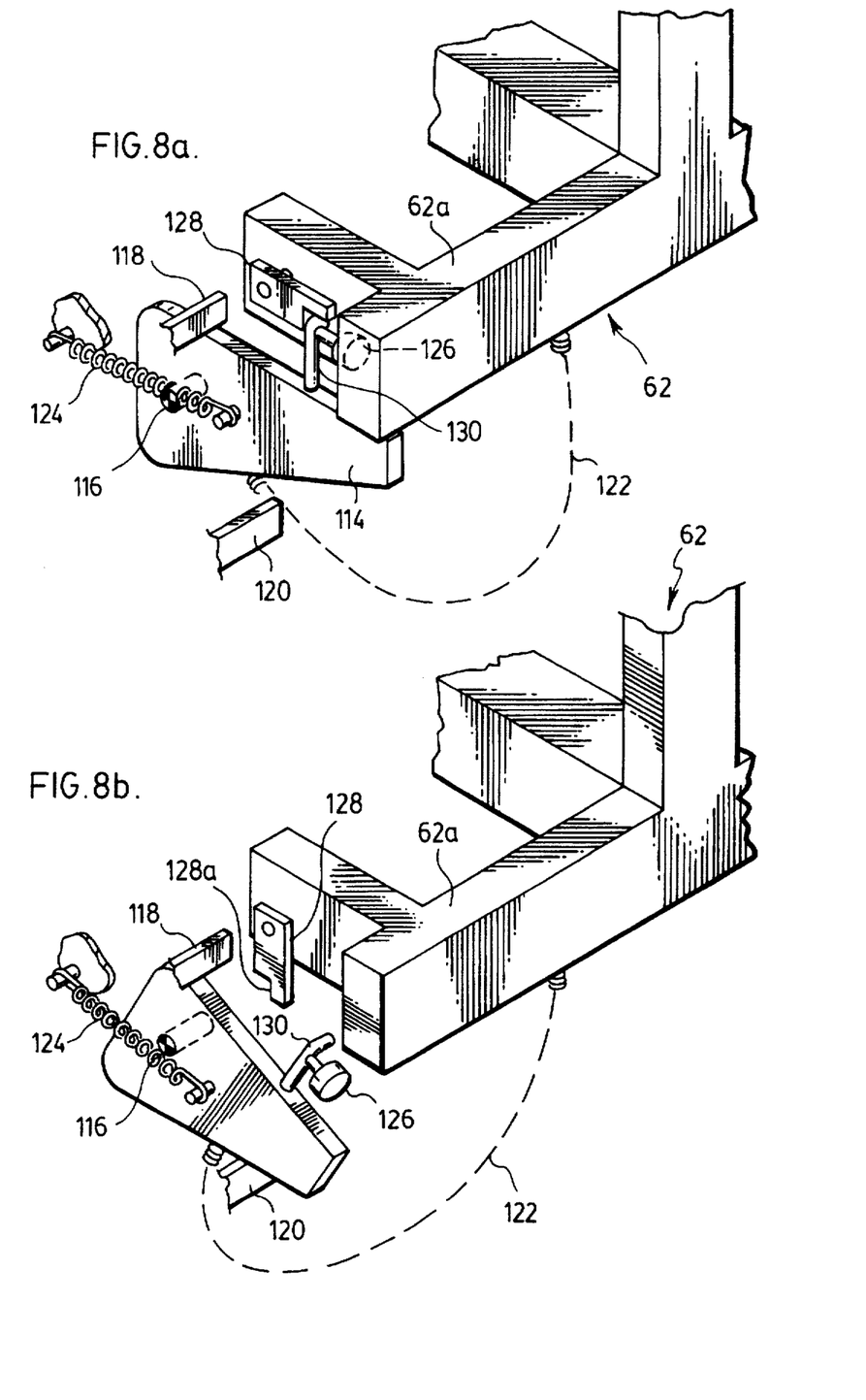
FIG. 8 comprises views denoted 8a) and 8b) illustrating a stop mechanism used in association with the roll-forming enclosure; and, FIG. 9 is a diagrammatic illustration of a core tube dispenser forming part of the harvester.

FIGS. 8a) and b) show an intermediate stop linkage that is used to automatically arrest the roll-forming enclosure in the intermediate position I (FIG. 2) for discharge of a core tube into the roll-forming enclosure. The linkage is shown in an arresting position in FIG. 8a), and in FIG. 8b), in an inoperative position clear of the roll-forming means.

The linkage includes a lever 114 which is pivoted to the main chassis 58 at 116, for movement between upper and lower stops 118 and 120. A tension spring 122 extends between the bottom edge of lever 114 and the frame 62 of the roll-forming enclosure. A further spring 124 operates over the centre of rotation of lever 114 to hold the lever against either of the two stops 118 and 120.

FIG. 8b) shows the lever against stop 120. In this position, the lever is clear of frame 62 so that the roll-forming enclosure is free to move from the roll-forming position to the discharge position. When the enclosure has moved fully to its discharge position, spring 122 pulls lever 114 over centre so that it moves to the position shown in FIG. 8a) in contact with stop 118. As the roll-forming enclosure turns back towards the roll-forming position and approaches the intermediate position I (FIG. 2), enclosure frame member 62a comes into contact with a bolt 126 which arrests the roll-forming enclosure in the correct position to receive a core tube 46 from the supply 64 (FIG. 2). A lever 128 carried by frame 62 is deflected upwards (counterclockwise) by a pin 130 on lever 114 until a notch 128a in the lever engages the pin 130. After a core tube has been dispensed, the roll-forming enclosure is rotated a few degrees back towards the discharge position by appropriate operator actuation of cylinder 112. This motion causes lever 128 to exert a downward force on pin 130, which in turn causes lever 114 to go over centre and come to rest on stop 120. The roll-forming enclosure can then be returned to the roll-forming position.

FIG. 6 has already been referred to in connection with the structure of conveyor 42. As noted previously, FIG. 6 also shows the roll 41 of netting that can be used to wrap the sod, for example, if the strip of sod is particularly fragile or if it is desired to provide a net wrap to facilitate subsequently handling of the roll. The roll itself is supported on a shaft or mandrel 132 that is removably received in a pair of notches 134 in a pair of side plates 136 forming part of the support frame for conveyor 40. For ease of illustration, the remainder of the frame has not been shown in detail, although a number of structural bars that extend between the two side plates 136 are shown at 137. Also extending between the side plates 136 at the extreme upper end of conveyor 40 are a pair of rollers 140 and 142 which are used to guide the netting as it is drawn off roll 41. The two rollers are mounted to turn on respective shafts 140a and 142a mounted between the side plates 136. The arrow denoted 143 shows that the netting is threaded below and around the lower roller 140, back between the two rollers and then over the top of roller 142.

When a netting wrap is required for a particular roll, the netting, after being threaded through the rollers 140 and 142, is simply placed on the upper run of the first conveyor 42 of the roll-forming enclosure and is then picked up by the conveyor and the sod so that it travels with the sod and is formed around the roll.

Upstream of the rollers 140, 142 the netting passes between a fixed clamp bar 144 and a movable clamp bar 145 that is carried at its ends on respective links, one of which is visible at 146, carried by a pivot shaft 147. An arm 148 on shaft 147 can be actuated by a solenoid 149 to move shaft 145 towards shaft 144 for clamping the netting.

A net cutter assembly 150 is mounted on the outer end of the side member 56 of conveyor 42 that will move across the path of the net as the roll-forming enclosure moves to the discharge position (i.e. the member 56 which is shown at the left in FIGS. 3 and 4. Assembly 150 includes a bracket 152 which supports a pair of cutter blades 154 that are arranged in a generally V-shaped configuration and which generally meet in the plane of the net. Thus, as the roll-forming enclosure moves from the roll-forming position to the discharge position, the blades 154 will effectively slice laterally through the net, generally in its plane, so that the net that has already been taken up by the sod will be severed from its supply. Solenoid 149 is actuated by the operator to clamp the netting at this time.

Figure 9:
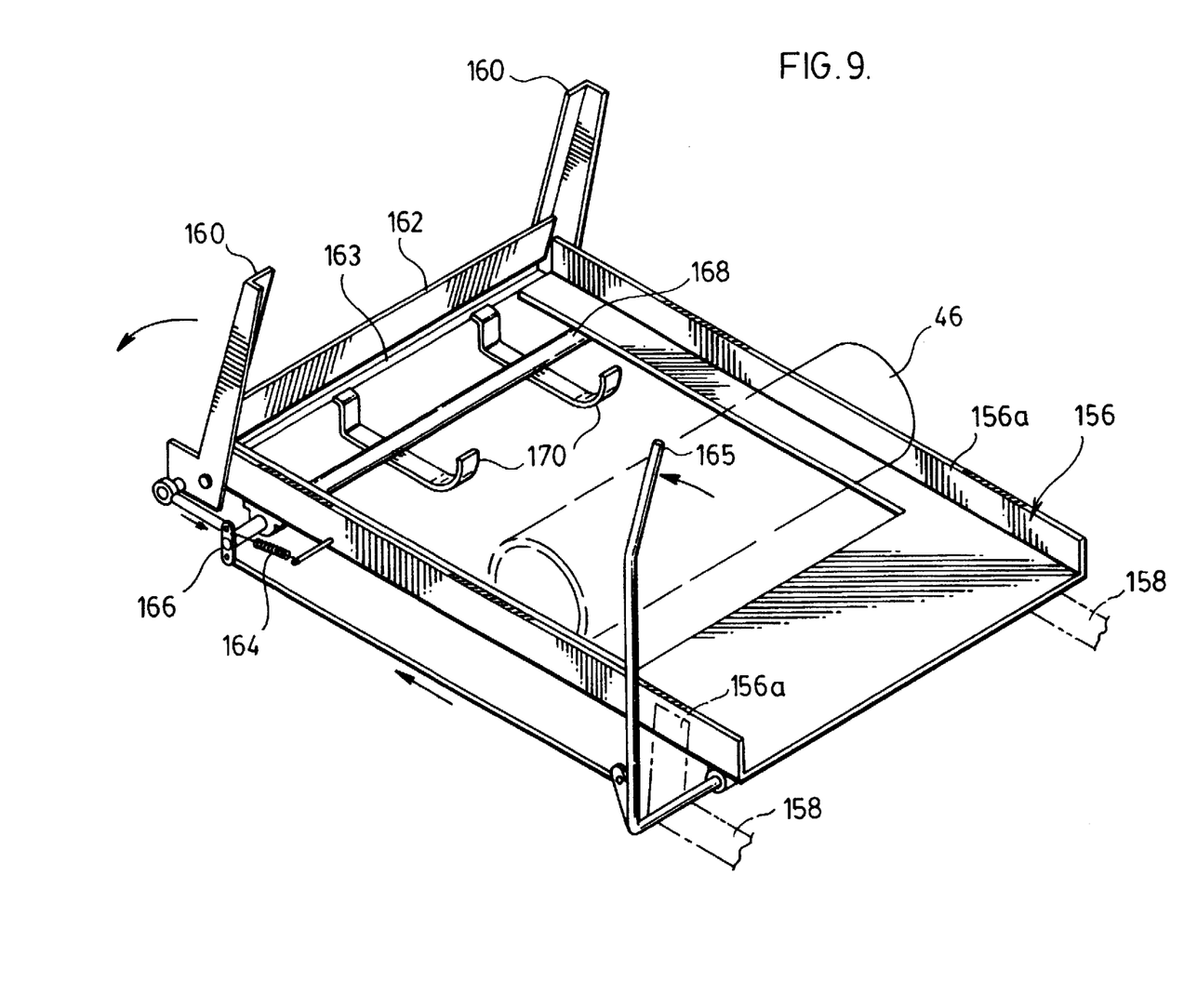

FIG. 9 shows the core tube dispenser which is indicated generally by reference numeral 64 in FIG. 2. The dispenser comprises a tray 156 which is supported by brackets 158 from the chassis of the tractor (not shown) so that the tray is slightly downwardly inclined and aligned with the lower conveyor 42 when the roll-forming enclosure is in the intermediate position I (FIG. 2). A number of core tubes (as tube 46—FIG. 1) lie transversely of the tray between respective flanges 156a along opposite sides of the tray.

As seen in FIG. 9, the left-hand end of the tray is the discharge end facing the roll-forming enclosure. A pair of arms 160 extend upwardly at opposite sides of the tray and are connected by a plate 162 that extends between the arms. The arms are pivotally mounted on a shaft 163 that extends across the end of the tray. The arms are spring-biassed to their upright positions by a tension spring 164 forming part of a linkage that extends between shaft 163 and an operator controlled release lever 165. The linkage also includes a double-arm lever 166 that is mounted on a shaft 168 extending transversely of tray 156 at a position spaced "upstream" from the end plate 162. Shaft 168 carries a pair of U-shaped elements 170 which form a "cradle" for receiving one of the core tubes prior to its release from the supply. The bottom of the tray is open in this area.

When the operator pulls on lever 165 (to the right in FIG. 9) the linkage will cause the lever 166 to turn in the counterclockwise direction as shown so that the U-shaped elements will in effect rock downwardly at their outer left-hand ends as shown, releasing a tube that was formerly cradled by the elements. At the same time, the inner ends of the elements will lift, preventing release of any additional tubes. Arms 160 will turn counterclockwise, carrying with them plate 162, so that the discharge end of the tray will no longer be obstructed and the core tube will be released to roll down the arms 160 and into the roll-forming enclosure. When the operator releases lever 165, spring 164 will return linkage to the condition shown in FIG. 9, allowing a further core tube to enter the "cradle" represented by those elements.

In summary, the apparatus provided by the preferred embodiment of the invention allows the rapid and automatic formation of large rolls of sod with or without netting wrap and with or without core tubes.

It will of course be appreciated that the description relates to a preferred embodiment only and that many modifications are possible within the broad scope of the invention. For example, while as a practical matter, it may be desirable to provide a conveyor between the side cutter assembly and the roll-forming enclosure, in principle, it may be possible to omit that conveyor (conveyor 40 in the preferred embodiment) and discharge the sod directly into the roll-forming enclosure.

Constructional details, such as the particular forms of conveyor used may also of course vary.

The lower conveyor (42) of the roll-forming assembly need not be pivotally mounted. The lower conveyor (42) could be reversible to discharge the sod rolls. The rolls could be discharged onto a ramp or even directly onto the ground, e.g. if the sod is sufficiently robust that damage is not a concern.

The net clamping bars 144, 145 (FIG. 6) could be replaced by other means for preventing unwinding of the wrapping material during severing, such as a brake on the netting roll or by using the guide rollers 140, 142 as clamps.

The harvester could be self-propelled rather than being designed as an attachment to another vehicle such as a tractor, as in the illustrated embodiment.

Finally, the roll-forming means could form the sod roll in the manner disclosed in the '130 patent, and/or the abutment means (e.g. fingers 48) could be used in a harvester other than the harvester of the preferred embodiment, e.g. a harvester of the form disclosed in the '130 patent.

We claim:

1. A sod harvester for movement along a cutting path, comprising:

cutter means for forming a strip of cut sod as the harvester travels along said path; and, sod roll forming means to which said strip of cut sod is delivered from said cutter means, said roll-forming means comprising first and second linear conveyors each having an inner end and an outer end and being operable to convey sod between said ends, said first conveyor being arranged to receive a leading end portion of an in-coming strip of cut sod and convey said strip towards the second conveyor, the conveyors being arranged with their inner ends adjacent one another and at a substantial angle with respect to one another, selected so that said second conveyor in use causes said leading end portion of the strip of sod to tend to turn back on itself for forming a roll, the roll-forming means further including means for laterally confining the growing roll of sod to assure formation of said roll having ends which are square with respect to the surface of the roll;

wherein the roll-forming means comprises a unit which is turnable about a generally upright axis between a roll-forming position for receiving said strip of cut sod and forming said roll, and a discharge position in which said first conveyor is directed laterally of said path of travel for discharge of a formed roll to a position which is laterally clear of the next pass of the harvester.

2. A sod harvester as claimed in claim 1, wherein said first and second conveyors are arranged so that said substantial angle is generally a right angle.

3. A sod harvester as claimed in claim 1, further comprising abutment means associated with said second conveyor and located to obstruct travel of said leading end portion of said strip of sod along said second conveyor for assuring formation of said roll, the abutment means being deflectable to a non-obstructing position by said roll of sod as the roll grows in size.

4. A sod harvester as claimed in claim 3, wherein said second conveyor comprises an endless belt which is movable to convey sod between said first and second ends of the conveyor, and wherein said abutment means comprises a pair of fingers that are located on opposite sides of the belt so as to protrude beyond an upper run of the belt and engage marginal regions of a said leading end portion of said strip of sod, and means biassing said fingers towards positions in which the fingers obstruct travel of said leading end portion of said strip along said second conveyor, while permitting the fingers to be deflected to said non-obstructing position.

5. A sod harvester as claimed in claim 1, wherein said first and second conveyors are oriented so that said first conveyor is generally horizontally oriented when said roll-forming means is in said roll-forming position, and wherein the harvester further comprises intermediate conveyor means which is upwardly inclined from said cutter means and said first conveyor for conveying said strip of sod generally horizontally into the roll-forming means.

6. A sod harvester as claimed in claim 5, wherein said first conveyor is tiltable about a generally horizontal axis adjacent its said inner end between said generally horizontal orientation when the roll-forming means is in said roll-forming position, and an orientation in which the first conveyor is tilted downwardly at its outer end, when the roll-forming means is in said discharge position, and means for normally maintaining said first conveyor in its generally horizontal orientation, while permitting release of the conveyor to its tilted position under the weight of a formed roll of sod.

7. A sod harvester as claimed in claim 6, wherein said means normally maintaining the first conveyor in its generally horizontal orientation comprises spring means biassing the first conveyor towards said generally horizontal orientation, and releasable latch means for retaining said first conveyor in said orientation.

8. A sod harvester as claimed in claim 7, wherein said releasable latch means includes linkage means carried by said roll-forming means for movement with roll-forming means between said roll-forming position and said discharge position, and trip means which is fixed with respect to the roll-forming means, and positioned to automatically actuate said linkage and release said latch means as the roll-forming means reaches said discharge position.

9. A sod harvester as claimed in claim 5, further comprising means for supporting a roll of material for wrapping said strip of sod below an end portion of said intermediate conveyor adjacent said roll-forming means; guide means for said wrapping material located to guide said material from said supply and between said intermediate conveyor and said first conveyor so that the wrapping material can be drawn from said supply and onto said first conveyor below said strip of sod and wrapped around the strip as it is formed into a roll; means for severing said material from the supply under the control of an operator of the harvester; and means for preventing withdrawal of the wrapping material from the supply during severing of the material by said severing means.

10. A sod harvester as claimed in claim 9, wherein said severing means comprises a knife carried by said roll-forming means and located at a side of said roll-forming means remote from said discharge position, so that the knife moves across the path of the wrapping material as the roll-forming means moves from its roll-forming position to its discharge position, for severing the wrapping material.

11. A sod harvester as claimed in claim 1, further comprising means for temporarily arresting return movement of the roll-forming means from said discharge position to said roll-forming position, in an intermediate position for receiving a core tube around which said roll of sod is to be formed, and core tube supply means generally in alignment with said roll-forming means at said intermediate position, said supply means including means for releasing individual tubes from said supply, into said roll-forming means.

12. A sod harvester as claimed in claim 11, further comprising latch means for automatically arresting said roll-forming means in said intermediate position during said return movement of the roll-forming means from said discharge position towards said roll-forming position, said latch means being movable between an arresting position in which it engages said roll-forming means in said intermediate position, and an inoperative position clear of said roll-forming means, the harvester further comprising an actuator element extending between said latch means and said roll-forming means for causing movement of the latch means to said arresting position as the roll-forming means reaches the discharge position, and release means for moving the latch means to said inoperative position when the roll-forming means is to be returned from said intermediate position to said roll-forming position under operator control.

13. A sod harvester as claimed in claim 11, wherein said core tube supply means comprises a tray for supporting a supply of core tubes with the tubes generally parallel to a notional axis about which said roll of sod is to be formed in said roll-forming means, and said release means being operable to permit an individual core tube to move under gravity into said roll-forming means.

14. A sod harvester as claimed in claim 13, wherein said release means comprises a cradle, means supporting the cradle for rocking movement between a first position for receiving said individual core tube from said supply, and a second position in which the core tube is released from the cradle for delivery to said roll-forming means, and lever means for moving the cradle between said positions under operator control.

15. A sod harvester as claimed in claim 14, wherein said release means further comprises first and second arms which are movable in synchronism with said cradle between generally upright positions in which they obstruct release of a core tube from said tray, and downwardly inclined positions in which said core tube can roll down said arms and into said roll-forming means.

16. A sod harvester for movement along a cutting path, comprising:

cutter means for forming a strip of cut sod as said harvester travels along said path; and, sod roll forming means to which said strip of cut sod is delivered from said cutter means, said roll-forming means comprising first and second linear conveyors each having an inner end and an outer end and being operable to convey sod between said ends, said first conveyor being arranged to receive a leading end portion of an incoming strip of cut sod and convey said strip towards the second conveyor, the conveyors being arranged with their inner ends adjacent one another and at a substantial angle with respect to one another, selected so that said second conveyor in use causes said leading end portion of the strip of sod to tend to turn back on itself for forming a roll, the roll-forming means further including: abutment means associated with said second conveyor and located to obstruct travel of said leading end portion of said strip of sod along said second conveyor for assuring formation of said roll, the abutment means being deflectable to a non-obstructing position by said roll of sod as the roll grows in size; and means for laterally confining the growing roll to assure formation of a roll having ends which are square with respect to the surface of the roll.

* * * * *